Sept. 22, 1931.  N. KOPP  1,824,216
METHOD OF MAKING GLASS CYLINDERS
Filed Feb. 27, 1929
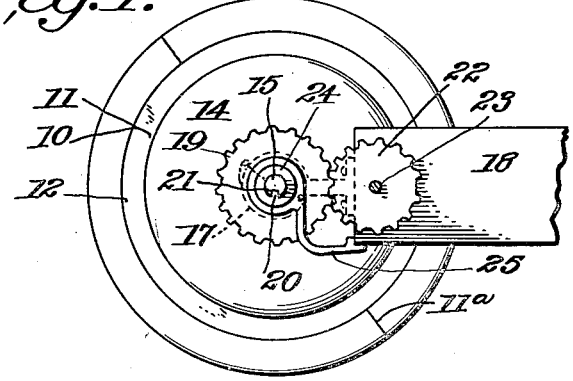
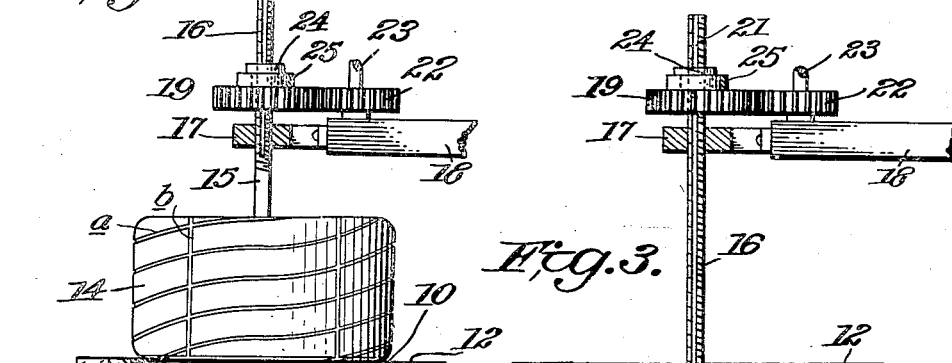
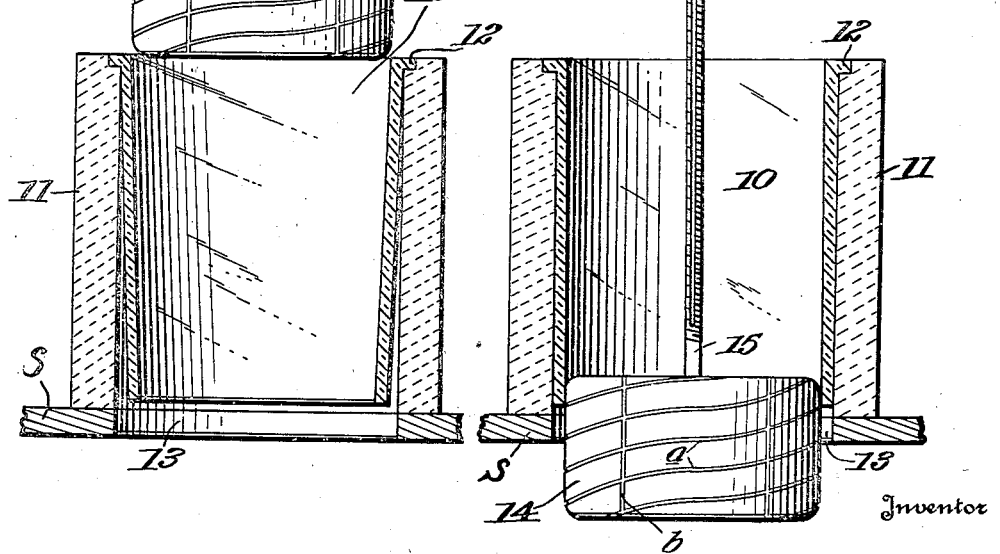
Inventor
Nicholas Kopp
By V. G. Doolittle
Attorney Patented Sept. 22, 1931

1,824,216

UNITED STATES PATENT OFFICE

NICHOLAS KOPP, OF PITTSBURGH, PENNSYLVANIA, ASSIGNOR TO KOPP GLASS, INCORPORATED, OF SWISSVALE, PENNSYLVANIA, A CORPORATION OF PENNSYLVANIA

METHOD OF MAKING GLASS CYLINDERS

Application filed February 27, 1929. Serial No. 343,230.

This invention relates to a method of providing a glass cylinder with a truly cylindrical or exact inside diameter whereby it will be practical to accurately fit a piston therein to thus enable use of the glass cylinder as an engine, pump or other cylinder where pressure is desired or involved.

Such an article cannot be made by existing methods of glass cylinder manufacture, which may be classified into the blowing method and the pressing method. According to the blowing method, in making a cylinder an uncertain amount of glass on the end of a pipe is blown into a bulb, swung out, and then shaped in a cylindrical mold to accord with the contour of the latter. This produces a cylinder of sufficiently accurate outside dimensions, but the interior dimensions of any two cylinders are never the same. Reverting to the pressing method, a tapered mold and plunger must be used, which cannot pass completely through the mold or cylinder as it must be pulled or withdrawn from the glass and which, therefore, must necessarily be tapered.

According to the present invention, it is aimed to treat a glass cylinder comparatively roughly made, as by the pressing method heretofore referred to, according to a novel method to form the interiorly exact finished article.

The more specific objects and advantages will be pointed out in part and otherwise become apparent from a consideration of the following description taken in connection with accompanying drawings of apparatus capable of use in the practice of the method.

In said drawings:

Fig. 1 is a plan view of an apparatus illustrating the practice of the improved method; and Figs. 2 and 3 are substantially central vertical sectional views through the apparatus, the former showing the parts in position at the beginning of an operation and the latter illustrating the parts at an intermediate stage of an operation.

Referring specifically to the drawings, a glass cylinder is shown at 10 in the form in which it comes from a regular press mold, although it is capable of production in any preferred way. Such cylinder, because of its production by the pressing method, is slightly tapered as appears in Fig. 2. In order that the cylinder 10 may be used as a cylinder or a cylinder lining or the like in an engine, pump, or elsewhere, where pressure is involved, the interior or bore surface must be exact and truly cylindrical, and it is the purpose of this invention to form such a truly cylindrical and exact inner surface in such glass cylinder.

In practicing the method, the tapered cylinder 10 is disposed in a cylindrical mold 11, of refractory or other material, which may be mounted on a conventional support as at S, having an opening 13 in its bottom registering with the bore of the mold. If desired, the upper end of cylinder 10 may have a laterally extending supporting flange 12 to rest on the mold. For the purpose of releasing a finished cylinder, the mold 11 is sectional and, by way of example, may consist of two arcuate sections which are separable along the radial lines 11a, as shown in Fig. 1, although the number of sections or particular construction is entirely immaterial. The means (not shown) for holding the mold sections together forms no part of the present invention.

After the cylinder 10 is pressed into the tapered form shown in Fig. 2, and before it is placed in the mold 11, it is heated so as to be of a semi-plastic consistency. While in this hot and semi-plastic condition, a cylindrical plunger 14, of the same external diameter as the largest diameter of the tapered cylinder 10, is simultaneously rotated and lowered or moved rectilinearly into and through the cylinder 10, completely or substantially completely throughout the length thereof, from the position shown in Fig. 2 to the position shown in Fig. 3. The combined or simultaneous descending and turning movement of the plunger 14 accurately shapes the inner or bore wall of the cylinder 10, pressing the same laterally against the inner wall of the mold 11 and, if necessary, permitting the cylinder to distend longitudinally, thus so finishing the bore of the cylinder that it may be accurately fitted by a piston or plunger for use in an engine cylinder, pump, or the like. When the plunger 14 is completely below the cylinder 10, or substantially so, as shown in Fig. 3, the sections of the mold 13 may be dis-assembled and the finished cylinder removed.

The plunger 14 may be provided with channels *a* and vertically extending channels *b* to relieve the contained air pressure.

Any suitable means may be utilized for imparting the simultaneous downward sliding and rotating movement of the plunger 14. By way of example, a rod 15 rises from the plunger 14, and is screw-threaded, as at 16, throughout the major portion of its length and the screw-threaded portion is engaged by a nut 17 fixed to a suitable support, as at 18. This nut is of any suitable separable type, which enables ready release of and re-engagement with the rod 15. A gear wheel 19 has a key 20 integral therewith, which slidably enters an elongated slot 21 provided longitudinally of the rod 15. Gear wheel 19 is in mesh with a driving gear wheel 22 keyed to a shaft 23 suitably journaled on the support 18 and which shaft 23 may be rotated in opposite directions from any desired source of power. The gear wheel 19 has a flanged collar 24 which is journaled in a bracket or bearing 25 fastened to support 18, whereby the same is mounted particularly against vertical displacement.

It will be obvious that the driving of gear wheel 22 rotates gear wheel 19, thus rotating rod 15 and the plunger 14. At the same time, due to the engagement of screw threads 16 with those in the bore of the nut 17, the plunger 14 will be raised or lowered according to the direction of rotation of shaft 28. At the end of one operation, the rod 15 will move out of engagement with gear 19, and thereupon the sectional nut 17 may be opened to rapidly release the rod so that the finished cylinder may be disengaged from the rod and plunger.

The apparatus shown is to be understood as conventional and by way of example only, since the method disclosed in this application is capable of being carried out in various ways.

I claim:

1. The method of surfacing a hollow glass article while in a pliable condition, consisting in subjecting a surface of the glass to combined rectilinear pressure and pressure in a direction at an angle thereto through the movement of a body against the same of different external shape to the initial shape of that portion of the article engaged by the body.

2. The method of surfacing a hollow glass article while in a pliable condition consisting in subjecting a surface of the glass arranged out of parallelism with the longitudinal axis of the article to combined rectilinear and radial pressure to shape it into parallelism with said axis.

3. The method of surfacing hollow glass internally of non-cylindrical form while in a pliable condition consisting in subjecting the interior surface of the glass to the action of an element provided with a cylindrical surface engaging the glass and having a combined rectilinear and rotating movement.

4. The method of surfacing hollow glass internally of non-cylindrical form consisting in subjecting the inner surface while in a pliable condition to the action of a member contacting therewith and moving rectilinearly and in the path of a circle so as to provide an exact cylindrical inner surface.

5. The method of surfacing an interiorly non-cylindrical hollow glass article while in a pliable condition consisting in longitudinally passing a plunger completely through the article in contact with the interior wall thereof, and in rotating the plunger during such passage, whereby an exact cylindrical surface is provided.

6. The method of providing a glass cylinder with an exact cylindrical inner surface consisting in producing a tapered cylinder and in passing through the tapered cylinder while in a heated condition, a cylindrical plunger peripherally acting on said inner surface and having a combined rectilinear and rotating movement.

7. The method of providing a glass cylinder with an exact cylindrical inner surface consisting in arranging a tapered cylinder while in a heated condition in a separable mold and in passing through said cylinder a cylindrical plunger which acts on the inner surface of the tapered cylinder with a combined rectilinear and rotating movement.

8. The method of providing a glass cylinder with an exact cylindrical inner surface consisting in heating a tapered glass cylinder and suspending the same in a separable mold, which permits release of the cylinder, and in passing through said cylinder while contained in the mold a cylindrical plunger acting on said inner surface rectilinearly and rotatably.

In testimony whereof I affix my signature.

NICHOLAS KOPP.